United States Patent [19]

Ikedo et al.

[11] 4,450,549
[45] May 22, 1984

[54] COMPACT BOOKSHELF TYPE RECORD PLAYER

[75] Inventors: Yuji Ikedo; Isami Kenmotsu; Nobuyuki Isobe, all of Saitama, Japan

[73] Assignee: Pioneer Electronic Corporation, Tokyo, Japan

[21] Appl. No.: 293,798

[22] Filed: Aug. 18, 1981

[30] Foreign Application Priority Data

Aug. 18, 1980 [JP] Japan .................................. 55-112689

[51] Int. Cl.³ .......................... G11B 1/00; G11B 25/04
[52] U.S. Cl. .................................. 369/75.1; 369/77.1; 369/263; 369/264
[58] Field of Search ................. 312/8; 369/75, 77, 79, 369/263, 264, 75.1, 77.1

[56] References Cited

U.S. PATENT DOCUMENTS 2,642,327  6/1953  Swanson ................................. 312/8
2,712,942  7/1955  Smits ..................................... 369/77
3,079,159  2/1963  King et al. ............................ 369/75

Primary Examiner—Steven L. Stephan
Attorney, Agent, or Firm—Sughrue, Mion, Zinn, Macpeak and Seas

[57] ABSTRACT

A compact bookshelf type record player having a back and forth movable slide base. The slide base is movable between a receiving position, a play position and a record change position. A tone arm is mounted on a fixed chassis of the player cabinet. The positions of the slide base is controlled by operational switches. Further, the record player is provided with novel rack and gear means for driving the slide base and with novel record detecting means for detecting attachment and absence of the record disc.

19 Claims, 28 Drawing Figures

COMPACT BOOKSHELF TYPE RECORD PLAYER

BACKGROUND OF THE INVENTION

The present invention relates to a compact bookshelf type record player. More particularly, the present invention relates to a record player such that a slide base is slidably mounted on a fixed member of a player cabinet, a rack member is movably supported on the slide base, and the slide base and the rack member are selectively engaged with each other by using a lock lever therebetween whereby movement of the slide base can be suitably mounted.

In general, a conventional record player has a relatively large physical size due to the fact that a turntable having a diameter somewhat greater than a diameter of a maximum record disc is used therein. This leads to an increment of the overall physical size of the player cabinet.

SUMMARY OF THE INVENTION

Therefore, an object of the present invention is to provide a compact record player overcoming the above noted defects.

An object of the invention is to provide a novel simple structure for a record player.

Another object of the invention is to provide a record player in which accurate operations can be achieved.

Another object of the invention is to provide a record player in which malfunctions of the player can be prevented.

These and other objects will be met by the following record player.

According to the present invention, a slide base slidably movable among a receiving position, a play position on a front side of said receiving position, and a record disc change position on a front side of said play position, a rack member movable back and forth on said slide base, rack member drive means for driving said rack member, and a lock lever pivotally mounted on said slide base, wherein said lock lever can be selectively engaged with said rack member to thereby control a movement of said slide base.

Further, according to the invention, a record player further comprises a turntable and a record detecting lever for detecting an attachment and absence of a record disc, said record detecting lever being pivotally mounted on said slide base, and when said record disc is attached to said turntable, said record detecting lever is rotated to a position out of a locus of said lock lever so that the engagement between said lock lever and said rack member is released, to thereby control the movement of said slide base.

According to the present invention, a record player comprises a player cabinet, a chassis fixed to said cabinet, a slide base slidably movable among a receiving position, a play position, and a record disc change position, said play position being located in front of said receiving position and said record disc change position being located in front of said play position, a rack member movable back and forth on said slide base, rack member drive means for driving said rack member, a lock lever pivotally supported to said slide base and engageable selectively with said rack member and said chassis, and record disc detecting means including a stop which is abuttable against an associated stop formed on said chassis at said record disc change position, wherein when a record disc is attached to said turntable, said record detecting lever is rotated to a position out of a locus of said lock lever so that the engagement between said lock lever and said rack member is released to thereby control the movement of said slide base.

According to another aspect of the invention, a record player includes a crank for driving the tone arm driving plate, the crank being coupled to the rack drive gear, and a stop position of the crank at the time when the slide base is located at the receiving position and a stop position of said crank at the time when the slide base is located at the play position are substantially identified with each other.

Further according to the invention, a record player, further comprises a cabinet, a chassis fixed to the cabinet, and when the slide base is located between said play position and said receiving position and said slide base is located behind said play position, a pickup stopper is moved to a position where the tone arm is prevented to rotate and in abutment with the slide base.

The tone arm pickup plate is located substantially under a bearing of the tone arm, and an opening is formed at an upper portion of a horizontally rotational shaft of the tone arm, said opening through which output lead lines for the pickup cartridge are provided.

When the turntable is moved from the record disc change position to the play position and the attachment of the record disc on the turntable is detected by the record detecting means, the tone arm is forwardly rotated to a play commencement position.

According to the invention, a record player comprises a record disc detecting pin spring-biased to extend downwardly from the turntable when a record disc is attached on the turntable, a record disc detecting lever pivotally supported to the slide base and rotatable by the record disc detecting pin extending from the turntable, thereby making the slide base held at the play position, and a reset lever pivotally to the slide base and coupled to the record disc detecting lever so that the reset lever and the record detecting lever are spring-biased to rotate away from each other, whereby the slide base is located at the record change position, the reset lever is in abutment with an upright portion of the chassis and is slightly rotated to thereby allow the record disc detecting lever to escape away from a locus defined by the record detecting pin.

The record player of the invention includes an index cam for controlling a lead-in position of the tone arm and rotatable around a pivot axis thereof in abutment with an outer periphery of the record disc, whereby prior to the stop of said slide base at said record disc change position, the index cam is reset by the crank.

The record player includes fluctuation preventing means which are interposed between the player cabinet and the chassis, and guide means for guiding the slide base movably.

The record player includes operational switches fixed to the cabinet.

According to the invention, a record player includes a sub-turntable or record receiving preventing device comprising an improvement in which when a sub-turntable or a record disc having a greater diameter than the main turntable is moved behind the play position, a further rearward movement of the sub-turntable or the record disc is prevented, and the sub-turntable or the record disc is returned back to the record disc change position.

BRIEF DESCRIPTION OF THE DRAWINGS

In the drawings:

FIG. 14 is a plan view of parts of the player showing the state wherein the slide base is locked and the tone arm is led in;

DESCRIPTION OF PREFERRED EMBODIMENT

The present invention will now be described with reference to the accompanying drawings.

Figure 1:
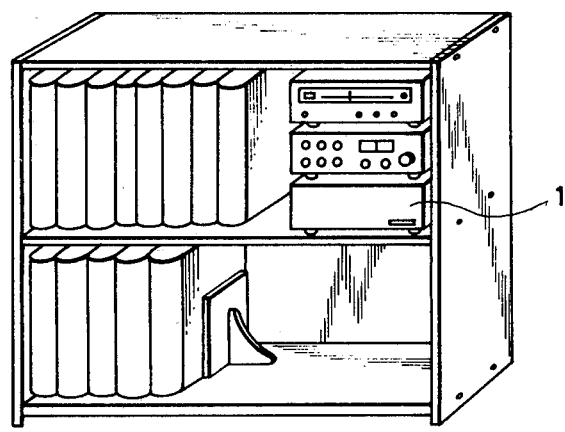
FIG. 1 is a perspective view of a bookshelf type record player according to the present invention which is received in the bookshelf.
Figure 2:
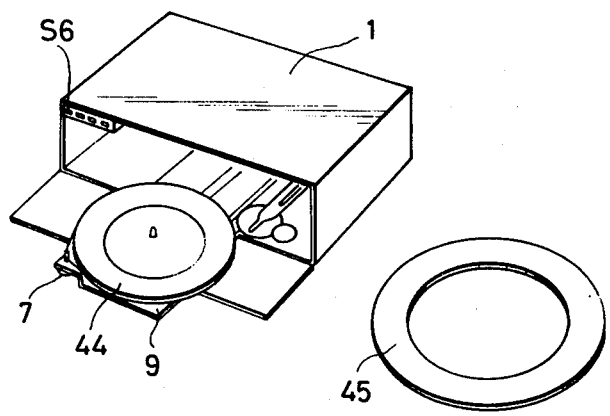
FIG. 2 is a perspective view showing a state wherein the slide base is moved to the record disc change position.

FIG. 1 shows a bookshelf type record player 1 having the same size as a tuner and a pre/main amplifier, which together can be arranged in a stacked arrangement on a bookshelf. The overall player cabinet is 320 mm wide, 200 mm deep and 98 mm high. The player has substantially the same width and depth as a standard A4 size sheet of 30 cm×21 cm. The player cabinet can be fully received in the bookshelf without parts projecting from the bookshelf. FIG. 2 is a schematic perspective view of the record player showing a state where a front cover is opened and a slide base 9 on which a phonomotor 7 is mounted is moved forwardly from a retracted position to a record disc change position. On the slide base 9 is disposed a turntable 44 which has a diameter somewhat smaller than the depth of the player cabinet. With the turntable 44, it is possible to obtain a sufficient record disc rotation, but the turntable 44 is so constructed that an annular sub-turntable 45 can be stacked thereon in order to obtain a much superior performance.

Figure 3A:
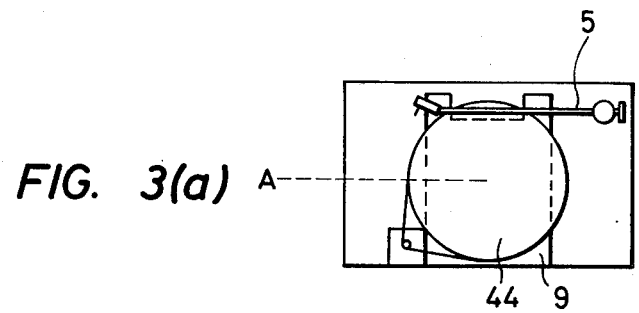
FIGS. 3A, B and C are illustrations of the operation of the record player.
Figure 3B:
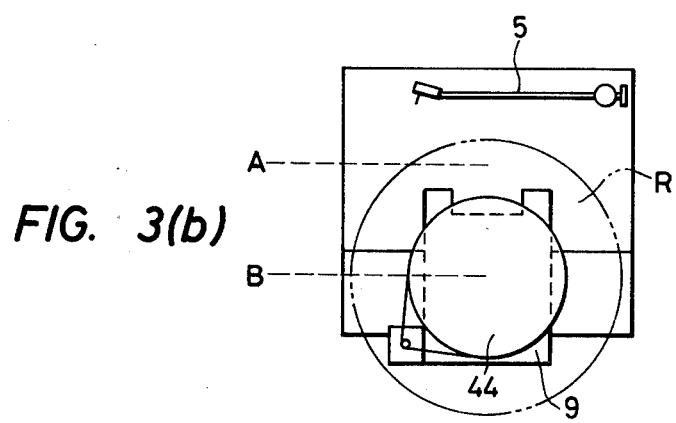
Figure 3C:
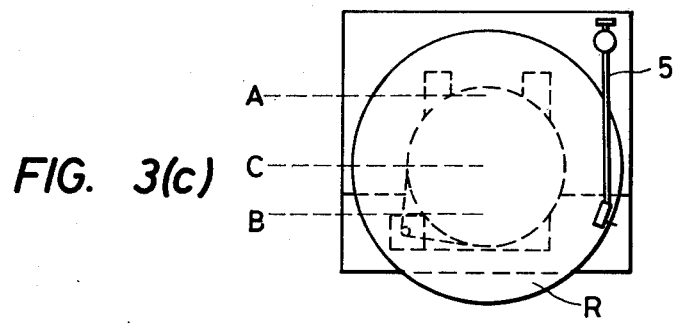

Reference now to FIGS. 3(a) to (c), cooperations between the slide base 44 and a tone arm 5 will be explained. Movements of the slide base 9 and the tone arm 5 can be controlled solely by a depression of a start/stop switch S6 later described. The slide base 9 is moved in the order of a receiving position shown in FIG. 3(a), a record disc change position shown in FIG. 3(b), a play position shown in FIG. 3(c), the record disc change position shown in FIG. 3(b), ((c), (b), (c),. . . ) and the receiving position shown in FIG. 3(a). In the receiving position, the slide base 9 is fully received in the player cabinet, a turntable shaft is positioned at A in FIG. 3(a), and the tone arm 5 is positioned on the rear side of the turntable 44.

When the front cover is opened and the start/stop switch S6 is depressed, the slide base 9 is moved forwardly to the frontmost position and is stopped at the record disc change position shown in FIG. 3(b). At this time, the turntable shaft is positioned at B in FIG. 3(b). In this position, if necessary, the sub-turntable 45 is attached and the record disc R is attached thereon. Then, when the start/stop switch S6 is again depressed, the slide base 9 is moved in the opposite direction and is stopped at the position shown in FIG. 3(c). Thereafter, the tone arm 5 is rotated forwardly and is lowered at a position corresponding to a leading groove of the record disc R. At this time, the turntable shaft is positioned at C in 3(c). When the tone arm 5 is rotated close to the ending groove upon completion of the play, the tone arm is lifted and is again rotated rearward of the turntable 44. At the same time, the slide base 9 is moved forwardly and is stopped at the record disc change position shown in FIG. 3(b).

In this state, when record discs are exchanged and the start/stop switch S6 is depressed in the same manner, the slide base 9 is moved to the position shown in FIG. 3(c) for the record play. Thereafter, the slide base 9 is again moved to the record disc changing position shown in FIG. 3(b). The same operations are repeated when necessary.

In order to move the slide base 9 to the receiving position shown in FIG. 3(a), when the record disc R is removed (in case of use of the sub-turntable 45, the sub-turntable 45 is also removed) and the start/stop switch S6 is depressed, the slide base 9 is moved rearwardly directly to the receiving position shown in FIG. 3(a) without stopping at the play position shown in FIG. 3(c) and is held at the receiving position.

Figure 4:
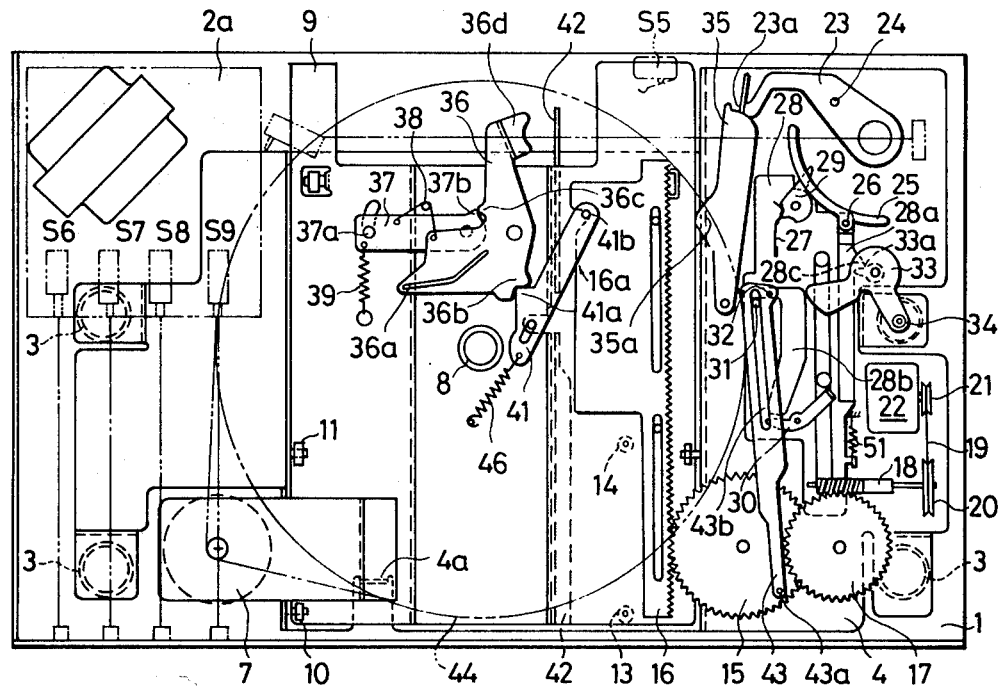
FIG. 4 is a plan view of the player cabinet from which the upper plate thereof and the arm base have been removed.
Figure 5:
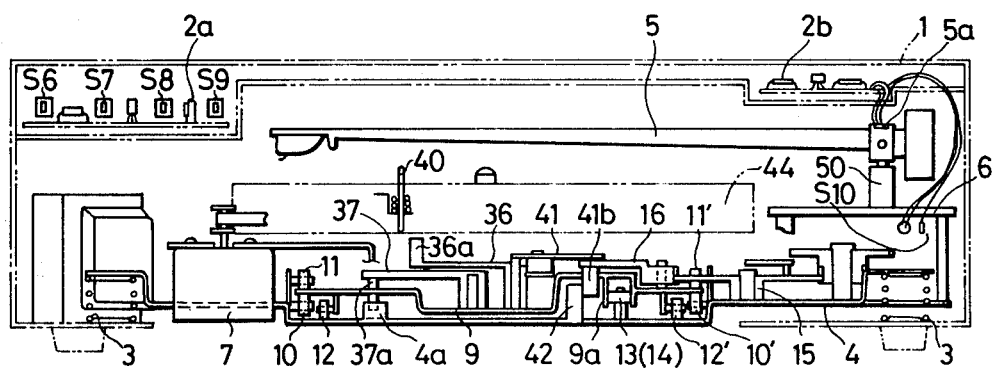
FIG. 5 is a front view of the player shown in FIG. 4.

A preferred specific inner mechanism of the player according to the present invention will now be described. FIG. 4 is a plan view of the inner mechanism of the player from which an upper plate of the player cabinet and an arm base 6 have been removed. FIG. 5 is a front view of the mechanism shown in FIG. 4.

In the player cabinet 1, operational switches S6 to S9 and circuitries 2a and 2b are provided at an upper section of the player cabinet 1. A chassis 4 is supported at a lower section of the player cabinet 1 through damping means 3 such as springs for absorbing fluctuations or vibrations. The chassis 4 is provided with an arm base 6 supporting the tone arm 5 and a tone arm rotation drive mechanism. The slide base 9 is slidably supported back and forth. The slide base carries the phonomotor 7 and a turntable shaft bearing 8. A vertical movement of the slide base 9 is restricted by two pairs of guide rollers 10, 10', 11, 11' provided on the chassis 4 and a pair of guide rollers 12 and 12' provided on the slide base 9 whereas a movement of the slide base 9 in the right and left directions is restricted by a U-shaped recess 9a formed in the slide base 9 and guide rollers 13 and 14 provided on the chassis 4.

A rack drive gear 15 coupled to one end of a crank 43 by a crank pin 43a is engaged with a rack 16 supported slidably on the chassis 4, and is rotated by a motor 22 through a worm wheel 18 and a belt 19. The numbers of gear teeth of the rack drive gear 15 and the rack 16 are so determined that when a lead-in operation of the tone arm 5 is completed by a tone arm drive plate 28 later described, the slide base 9 is just received at the receiving position.

A pickup plate 23 is fixed to the tone arm 5 and is rotated together. On the pickup plate 23 are formed an end portion 23a for selectively preventing the rotation of the pickup plate 23 and a pin 24 for engaging with the drive plate 28. An aperture 5a through which output lead lines for a pickup phono cartridge are provided is formed in an arm pipe of the tone arm 5 just above a horizontally rotating shaft 50 (FIG. 5). The lead lines are connected to output terminals of the record player. An elevation seat 25 for moving up and down the tone arm 5 is slidably supported to the arm base 6 and is moved by an elevation shaft 26. A lower end of the elevation shaft 26 is in abutment with an elevation cam portion 28a formed on the drive plate 28. A well-known mechanism incorporating photoelectric elements and lamps for detecting a completion of the record play is provided to the arm base 6.

A lead-in clutch 29 toggle-biased by a leaf spring 27 and a rotatable resetter 30 are each pivotally mounted on the tone arm drive plate 28. The drive plate 28 is slidably mounted on the chassis 4 and is biased upwardly in FIG. 4 by the spring 51. A long slot 43b formed in the crank 43 is slidably engaged with a pin 31 fixed to the chassis. A drive pin 32 formed on the crank 43 and extending downwardly therefrom is inserted into a window 28b of the drive plate 28. A roller 34 which is abuttable against the outer periphery of the 30 cm record disc is provided on an upper portion of an index cam 33 in which a step portion is formed corresponding to the lead-in position of the tone arm 5. In the received state and the play state, as shown in FIG. 4, a projection 33a of the index cam 33 is engaged with a projection 28c of the drive plate 28 so that the index cam 33 is rotated through a predetermined angle.

A pickup stopper 35 is biased counterclockwise by spring means (not shown) and is provided with a cam portion 35a which is abuttable with a right hand end of the slide base 9. When the slide base 9 is positioned between the play position and the receiving position, the pickup stopper 35 is rotated in the clockwise direction so that as shown, the end of the pickup stopper 35 is in abutment with the end 23a of the pickup plate 23 thereby preventing the rotation of the pickup plate 23.

A record detecting lever 36 and a reset lever 37 are pivotally mounted on the slide base 9. Between the two members is disposed a rotation biasing spring 38. Projections 36c and 37b formed on the two members are in abutment with each other so that an opening angle of the spring is restricted. The reset lever 37 is provided with a pin 37a which abuts against an upright portion 4a formed integrally with the chassis 4 when the slide base 9 reaches the record change position. The reset lever 37 is biased counterclockwise. The record detecting lever 36 is provided with a projected bent portion 36a which abuts against a retractable record detecting pin 40 formed on the turntable 44 when the record detecting pin 40 is lowered by a gravitational force of the record disc. Further, the record detecting lever 36 is provided with an abutment portion 36b for preventing the movement of the lock lever 41 and an end portion 36c for engaging with a guide cam 42 fixed to the chassis or floating base 4 and preventing the movement of the slide base 9 when the record detecting lever 36 is rotated by the record detecting pin 40.

The slide base 9 is provided with the slidable rack 16 having a cam portion 16a engaged with the lock lever 41. The lock lever 41 is rotatably slidably mounted on the slide base 9 and a spring 46 is disposed between the slide base 9 and the lock lever 41. The lock lever 41 is provided with a protrusion 41a which is engageable with the abutment portion 36b of the record detecting lever 36 and a pin 41b which is engageable with the cam portion 16a of the rack 16 and the guide cam 42.

Figure 6A:
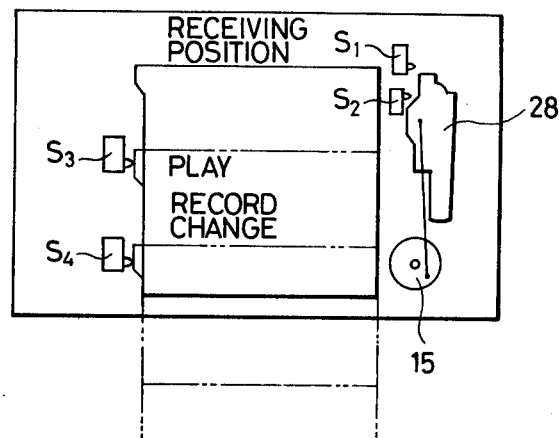
FIG. 6A is a plan view showing the arrangement of the limit switches.
Figure 7:
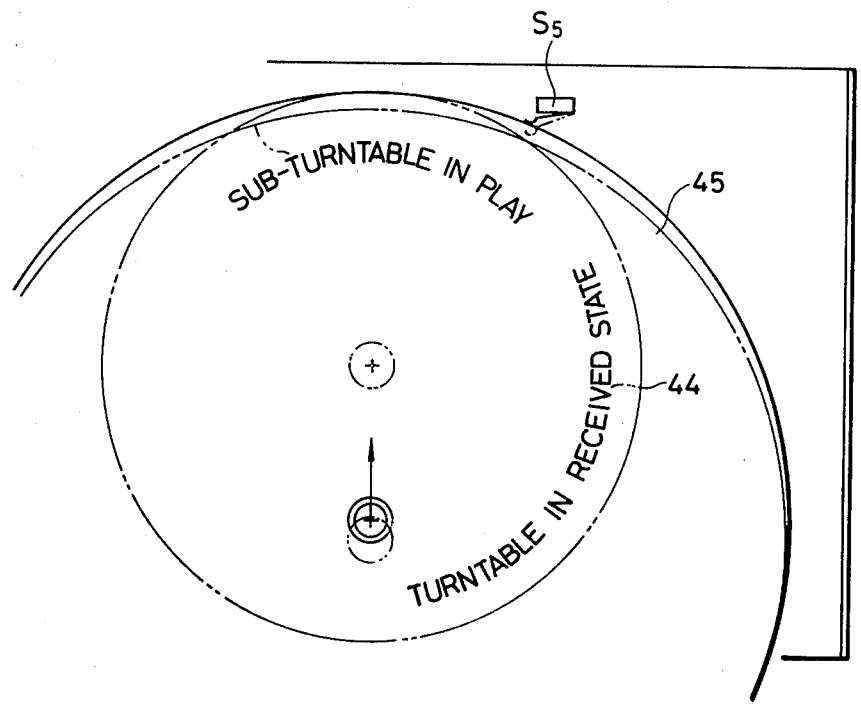
FIG. 7 is a view illustrating the operation of the safety switch.

The start/stop switch S6 for controlling the lead-in/return of the tone arm 5 and the out/in-movements of the slide base 9, a switch S7 for designating the repeated play, a switch S 8 for controlling the rotation rate of the phonomotor 7, and a cue switch S9 for independently operate the elevation mechanism thereby moving up and down the tone arm. The chassis 4 is provided with limit switches S1 to S4 as shown in FIG. 6A for detecting the positions of the slide base 9 and the drive plate 28. As shown in FIG. 7, a safety switch S5 is provided behind the turntable 44 in the receiving state and the sub-turntable 45 in the play state and in the passage of the sub-turntable.

The operations will now be explained.

(I) Receiving Position to Record Disc Change Position

Figures 8A, 8B, 8C:
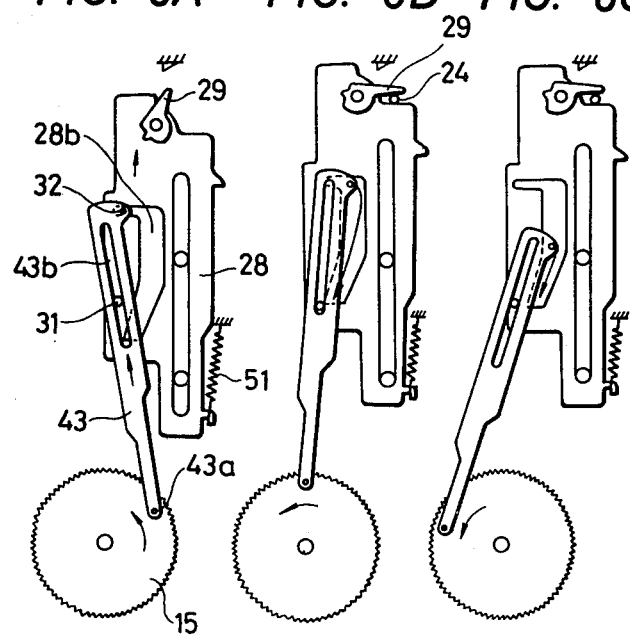
FIGS. 8A, B, and C are views showing the cooperation between the drive plate and the crank.

In the receiving position of the slide base 9 shown in FIG. 4, when the start/stop switch S6 is depressed, the motor 22 is operated to rotate the rack drive gear 15 in the counterclockwise direction. As shown in FIGS. 8A to C, since the long slot portion 43b of the crank 43 is guided by the pin 31 fixed to the chassis 4, a predetermined curved locus is formed by the drive pin 32 fixed to a rear end portion of the crank 43 so that the drive plate 28 is moved rearwardly in FIG. 8A and then allows the drive plate 28 to be retained at the rearmost position. More specifically, as shown in FIG. 8A, the drive plate 28 is moved upwardly in a half stroke up to the top dead center and at the same time, the lead-in clutch 29 is rotated by an abutment against a suitable fixed part of the chassis 4 or the like and is engaged with the engagement pin 24 of the pickup plate 23. However, as shown in FIGS. 8B and C, during another succesive half stroke, the drive pin 32 passes through the window portion 28b of the drive plate 28 with the drive plate 28 retained in the rearmost position. Thus, the drive plate 28 allows the tone arm 5 to be held at the receiving position without rotation.

Figure 9:
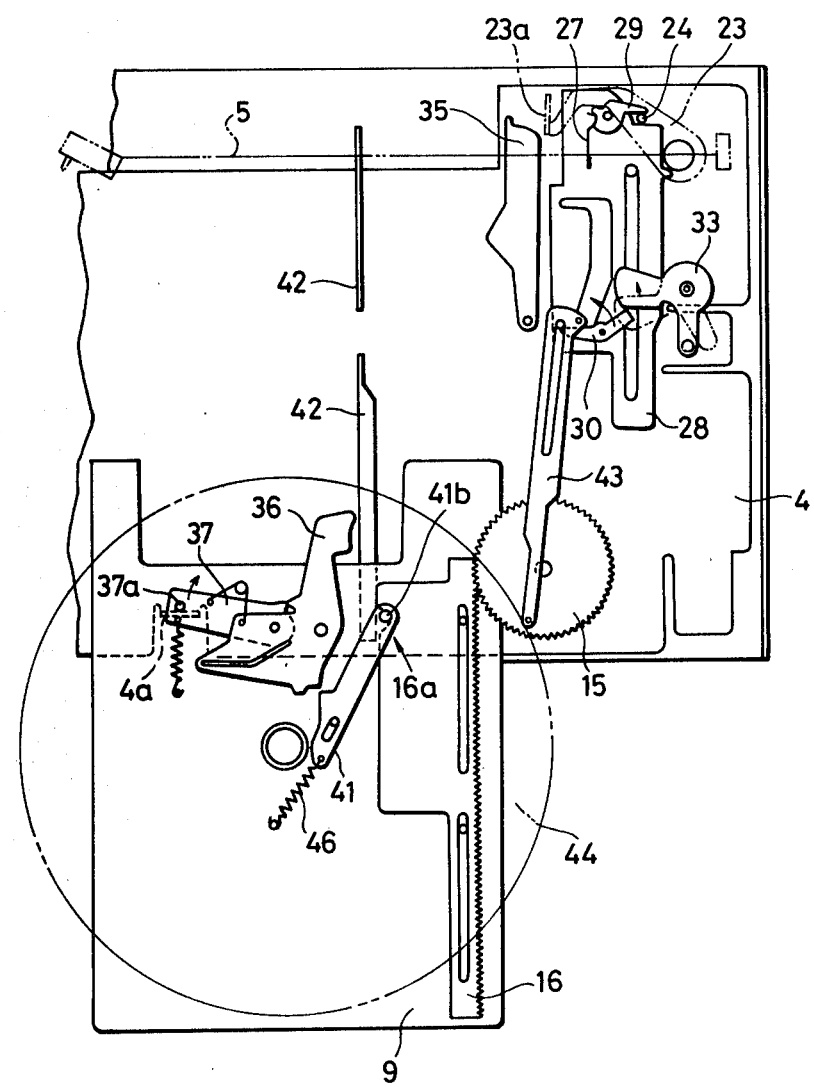
FIG. 9 is a plan view of parts of the player relating to the record disc change position.

In the final stage of the above described operation, the drive pin 32 is in abutment with the resetter 30 and allows the resetter 30 to rotate in the counter-clockwise direction as shown in FIG. 9. Then the index cam 33 is rotated to a position shown by solid lines in FIG. 9 irrespective of its original position. FIG. 9 shows state of the index cam, ready for abutment with the pickup plate 23 which will be rotate for the play position.

Figure 10A:
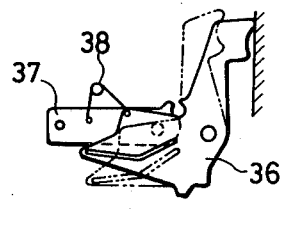
FIGS. 10A and B are views illustrating the reset of the record detecting lever.
Figure 10B:
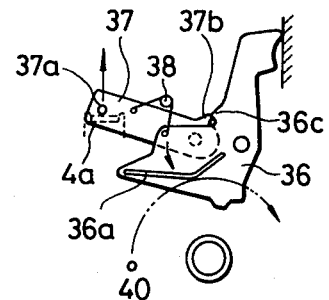

At the same time, the rack drive gear 15 renders the rack 16 to be driven forwardly. As shown in FIG. 9, the rack 16 allows the slide base 9 to move together since the cam portion 16a is in engagement with the projected pin 41b of the lock lever 41. As shown in FIG. 9, the rack 16 reaches the record disc change position and the limit switch S4 (FIG. 6) is operable to stop the motor 22. Just before the slide base 9 is stopped, the pin portion 37a of the reset lever 37 is rotated in the clockwise direction by the upright portion 4a of the chassis 4. As seen in FIGS. 10A and B, the record disc detecting lever 36 is rotated to the position shown in FIG. 10B irrespective of its original position. At this time, the projections 37b and 36c are brought into contact with each other to thereby define the rotational angle of the reset lever 37. At this position, the projected bent portion 36a deviates from the locus of the record detecting pin 40 of the turntable 44 and does not contact therewith.

(II) Record Disc Change Position to Record Play Position

Figure 11A:
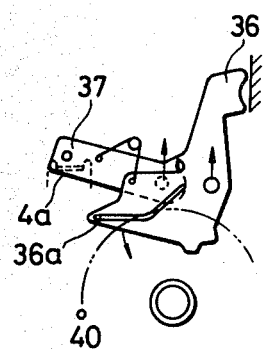
FIGS. 11A, B and C are views illustrating the operation of the record disc detecting lever which is moved from the record disc detecting position to the play position.
Figure 11B:
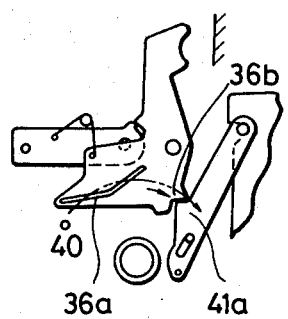
Figure 11C:
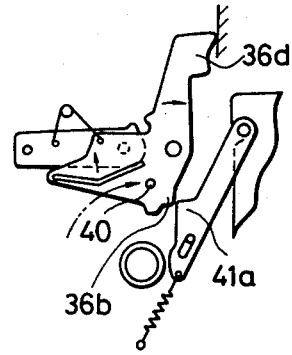
Figure 12A:
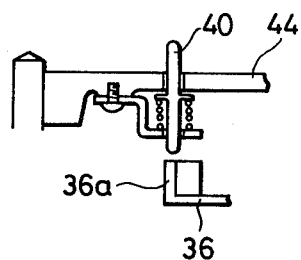
FIGS. 12A and B are views illustrating the operation of the record detecting pin in case of the record attachment.
Figure 12B:
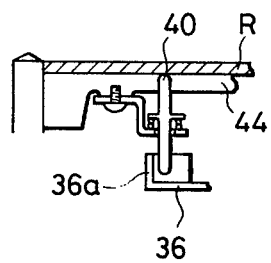

When a record disc R is attached and the start/stop switch S6 is again depressed, the rack drive gear 15 is rotated clockwise by the motor 22, and at the same time, the phonomotor 7 allows the turntable 44 to rotate. Then, the rack 16 is moved toward the rear side of the player cabinet. Since the pin 41b of the lock lever 41 is not moved in the lateral direction and is prevented from deviating from the cam portion 16a of the rack 16, the slide base 9 is also moved together with the rack 16. As shown in FIGS. 11A and B, the reset lever 37 is disengaged from the upright portion 4a of the chassis 4. The bent portion 36a of the record detecting lever 36 is set to a position in which it can be engaged with the record detecting pin 40. Since due to the attachment of the record disc R, as shown in FIGS. 12A and B, the record detecting pin 40 is positioned at a lower position, with the rotation of the turntable 44, as shown in FIGS. 11B and C, the record detecting pin 40 allows the record detecting lever 36 to rotate in the opposite direction.

Figure 13:
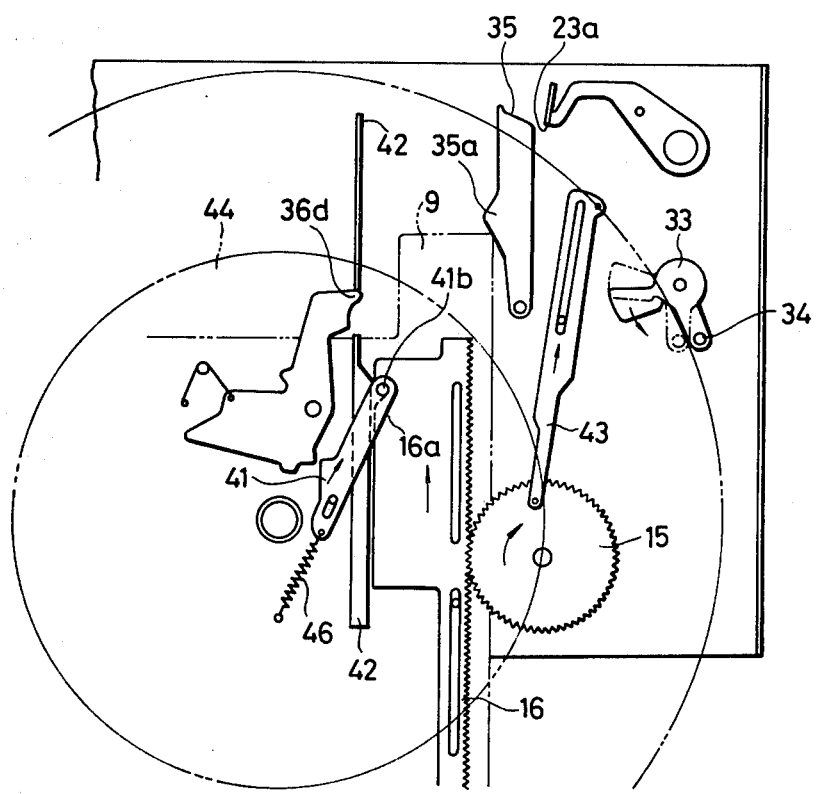
FIG. 13 is a plan view of parts of the player in the play mode.
Figure 14:
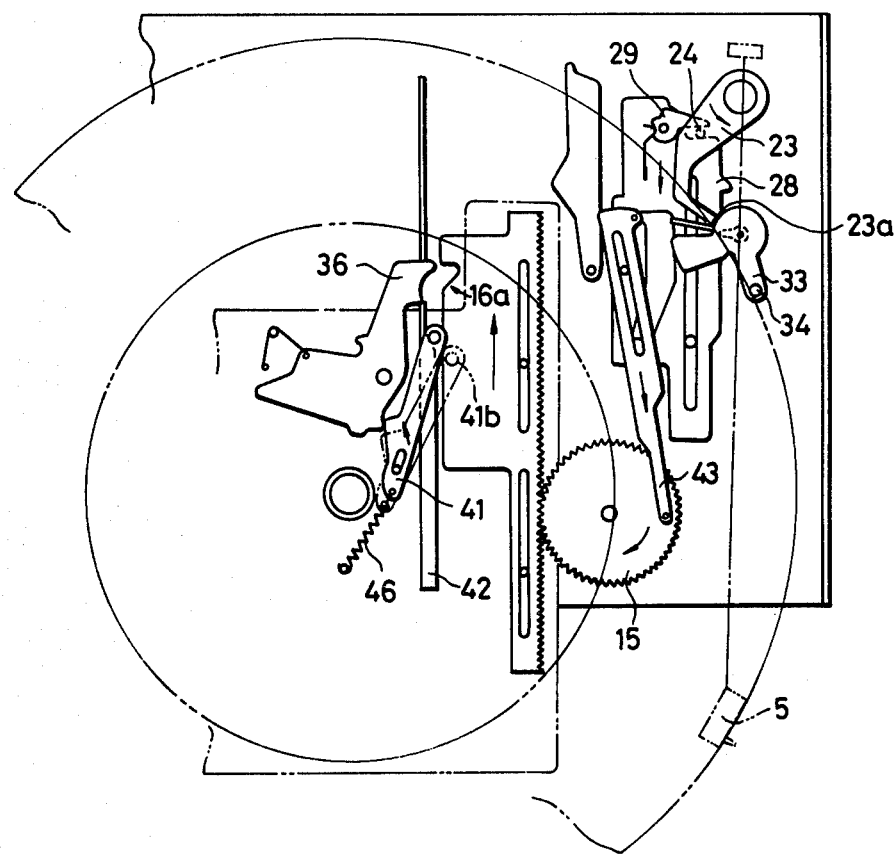

When the slide base 9 reaches the play position, the end portion 36d of the record detecting lever 36 is as shown in FIG. 13 engaged with a cutaway portion of the guide cam 42 to thereby prevent the movement of the slide base 9. Here, if the attached record disc has a diameter of 30 cm, as shown in FIG. 13, an outer periphery of the record disc is brought into contact with the roller 34 mounted on the index cam 33. In this condition, the pickup plate 23 end portion 23a is in abutment with the small diameter portion of the index cam 33. The pin 41b of the lock lever 41 is depressed rearwardly toward the slant portion of the guide cam 42 against the biasing force of the spring 46 by the action of the partial force applied from the slant surface of the cam portion 16a of the rack 16 and then abuts against the linear portion of the cam portion 16a as shown in FIG. 14. As a result, the rack 16 is slidable with respect to the slide base 9. In order to decrease the load imposed to the motor 22, roller means may be used for the pin 41 of the lock lever 41.

The slide base 9 is held at the play position and is biased thereto by the action of the spring 46 and the record disc detecting lever 36 engaging with the cutaway portion of the guide cam 42.

(III) Lead-in of Tone Arm

The drive plate 28 and the lead-in clutch 29 both of which clamp the pin 24 implanted in the pickup plate 23 are moved as shown in FIG. 14 in the opposite order to the order shown in FIGS. 8A to C and allow the tone arm 5 to rotate to the play stand-by position. In the play stand-by position, in case of the 30 cm diameter record disc, as shown in FIG. 14, the end portion 23a of the pickup plate 23 is in abutment with the small diameter portion of the index cam 33 and in other case, the end portion 23a is in abutment with the protrusion, i.e., the large diameter portion of the index cam 33.

Figure 15A:
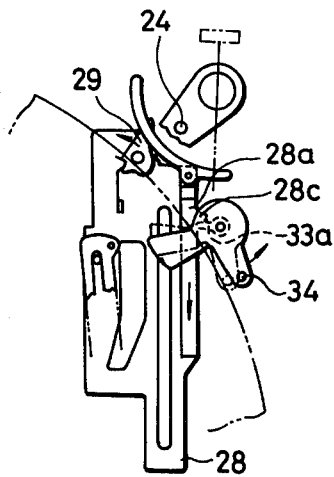
FIGS. 15A and B are plan and side views each showing the completion of the operation of lead-in of the tone arm.

When the drive plate 28 is further moved, the lead-in clutch 29 is rotated in the opposite direction to thereby release the engagement with the pin 24. As shown in FIG. 15A, the projection portion 28c of the slide plate 28 is adapted to abut against the projection 33a of the index cam 33 and allows the index cam 33 to rotate to thereby separate the roller 34 out of the outer periphery of the record disc. This prevents the damage of the record play.

Figure 15B:
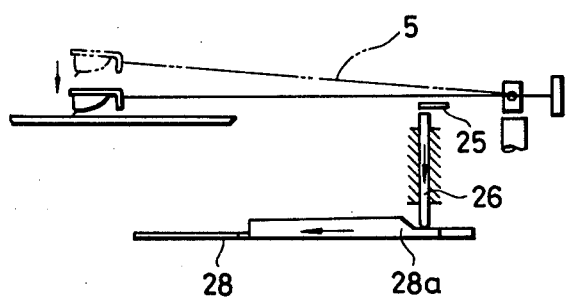

Subsequently, as shown in FIG. 15B, the elevation shaft 26 is lowered by the action of the cam portion 28a of the drive plate 28 and allows the tone arm 5 to be lowered onto the record disc to commence the play.

Upon the completion of the lower movement of the tone arm, the limit switches S1 and S2 are turned off as shown in FIG. 6 to stop the motor 22.

(IV) Return of Tone Arm

Figure 16A:
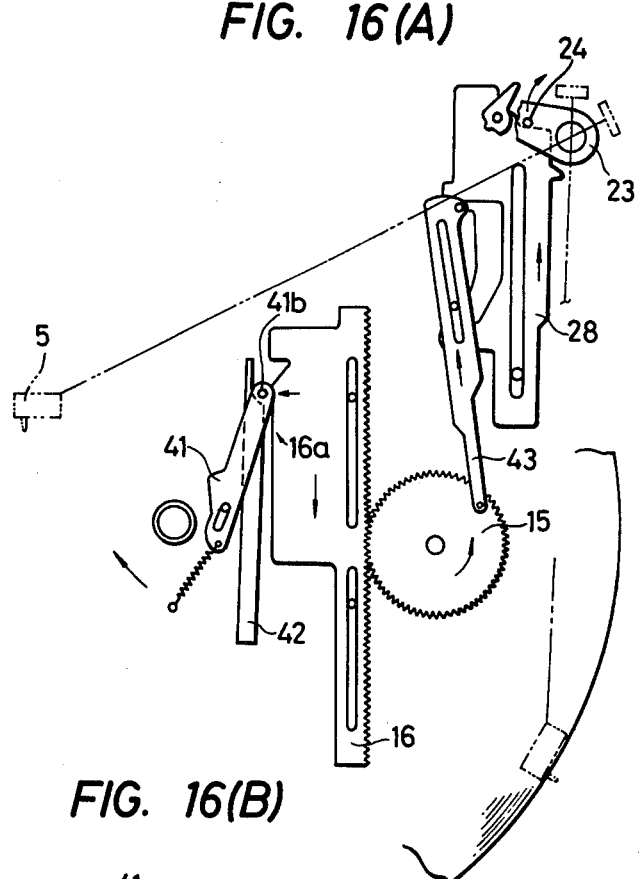
FIG. 16A is a plan view showing the return operation of the tone arm.

When the tone arm reaches the outlet groove of the record disc after the completion of the play, the motor 22 is actuated by a well known play ending detecting circuit to thereby rotate the rack drive gear 15 in the counterclockwise direction. As a result, the crank 43 allows the drive plate 28 to move in the direction indicated by the arrow in FIG. 16A, and the pin 24 of the pickup plate 23 is pushed by the end of the drive plate 28 to thereby rotate the tone arm 5 in the clockwise direction.

(V) Play Position to the Record Disc Change Position

At the same time, the crack 16 is moved forwardly, and the lock lever 41 supported by the slide base 9 is prevented from moving in the lateral direction by the linear portion of the cam portion 16a of the rack 16. Therefore, the pin 41b of the lock lever 41 cannot be disengaged from the slant portion of the guide cam 42 and the slide base 9 is not moved and solely the rack 16 is slid.

Figure 16B:
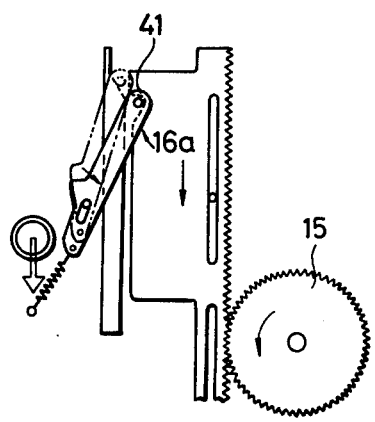
FIG. 16B is a view showing the engagement between the slide base and the rack.

After the tone arm 5 reaches the receiving position, the concave portion of the cam portion 16a of the rack 16 allows the lock lever 41 to rotate as shown in FIG. 16B and the slide base 9 is moved together to the record disc change position.

(VI) Repeat and Elevation

When the repeated plays are necessary, if the switch S7 of the operational portion is turned on, without depression of the start/stop switch S6 at the record disc change position, it is possible to again commence the play.

If detecting means for detecting the arriving of the tone arm 5 at the receiving position, for example, a photoelectric switch, is provided and thereby the motor 22 is oppositely rotated so as to lead-in the tone arm it is possible to reduce a time period which is necessary for the repeat operation.

In order to manually carry out the elevation of the tone arm it is sufficient to reciprocate the drive plate 28 between the elevation lift completion position and the lowering completion position.

(VII) Record Disc Change Position to Receiving Position

When the record disc is removed at the record disc change position and the start/stop switch S6 is depressed, the rack drive gear 15 is rotated in the clockwise direction.

At this time, the record detecting lever 36 is, as mentioned above, reset, and is moved as shown in FIG. 11B with the slide base 9 moving. The detecting lever 36 is engaged with the projected portion 41a of the lock lever 41 to thereby retain the lock lever 41.

In this condition, the slide base 9 is moved together with the rack 16 and reaches the play position. Since the record disc is not attached, the record detecting lever 36 is held at the position shown in FIG. 11B. The end 36d of the record detecting lever 36 is disengaged from the cutaway portion of the guide cam 42 and the lock lever 41 is not disengaged from the groove of the cam portion 16a of the rack 16 and is moved together into the receiving position.

Figure 17:
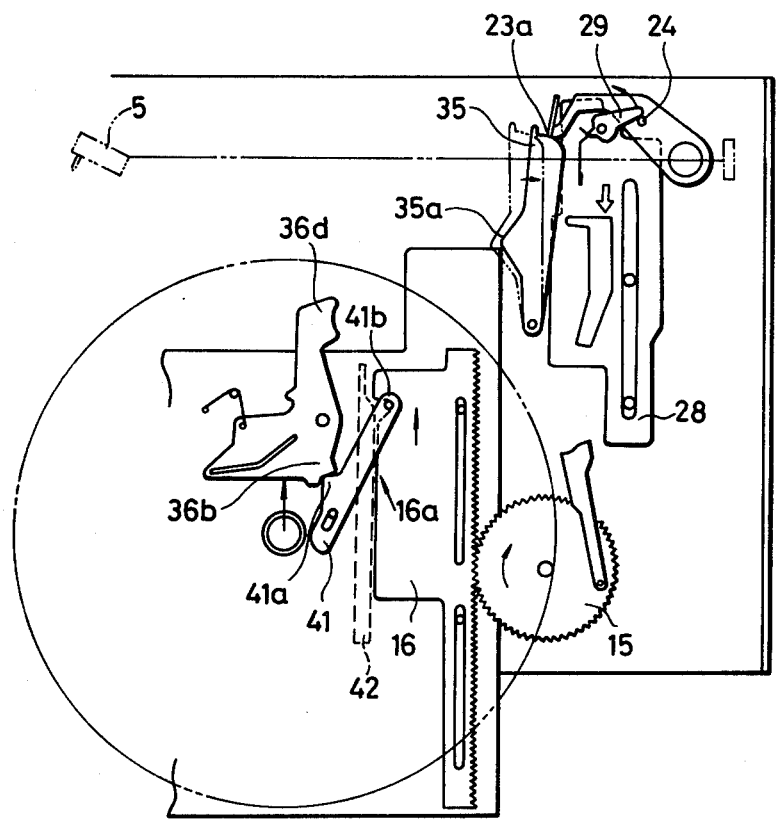
FIG. 17 is a view illustrating the movement to the receiving position.

After the slide base 9 passes through the play position, the right end of the slide plate is brought into contact with the cam portion 35a of the pickup stopper 35 so the cam portion 35a is rotated to the position shown by solid lines in FIG. 17. The end thereof is engaged with the pickup plate 23 to thereby prevent the rotation of the tone arm 5.

Since although the drive plate 28 is moved in the direction indicated by the arrow in FIG. 17 at the commencement of the play, the pickup plate 23 is prevented from rotating, the lead-in clutch 29 is oppositely rotated to thereby release the engagement pin 24 so that the tone arm 5 is held at the receiving position.

Figure 6B:
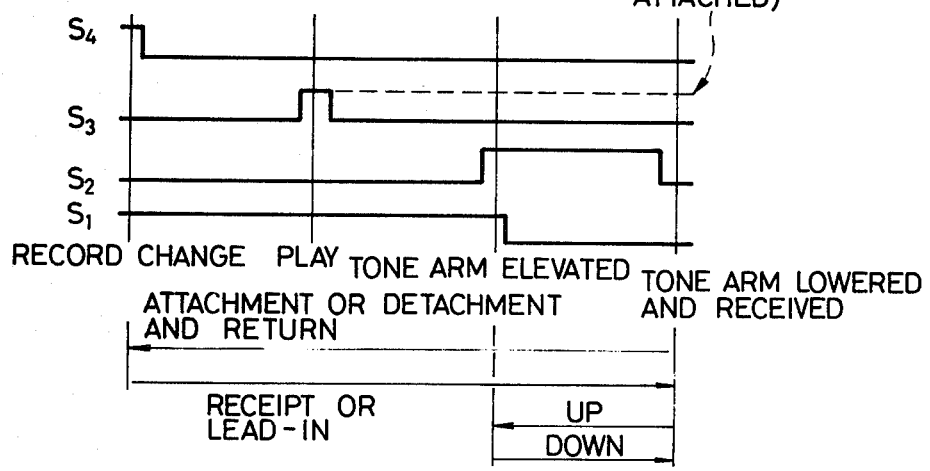
FIG. 6B is a timing chart concerning the switches shown in FIG. 6A.

Since the gear tooth numbers of the rack drive gear 15 and the rack 16 are suitably selected, the stop operation of the motor 22 may be controlled suitably when the limit switches S1 and S2 are turned off in the same manner as in the play start as shown in the chart in FIG. 6B.

(VII) Sub-turntable Receiving Preventing Device

If the start/stop switch S6 is depressed with the sub-turntable 45 attached and without the record disc attached, the slide base 9 is moved on the rear side of the player cabinet but since the record detecting pin 40 is not lowered, the slide base 9 is not stopped at the play position and the slide base 9 is further moved on the rear side of the cabinet.

Then, as shown in FIG. 7, the safety switch S5 is depressed to stop the motor 22. The, the start/stop switch S6 is depressed, the slide base 9 is moved to the record disc change position.

Also, when the safety switch S5 is depressed by the sub-turntable 45, the motor 22 may be rotated in the opposite direction so that the slide base 9 is returned back to the record disc change position. This construction is practically convenient.

As described above, according to the present invention, the slide base is slidably supported between the receiving position and the play position and between the play position and the record change position, also, the rack driven by the rack drive gear is movably supported slide base and the slide base and rack are engaged with each other selectively by the lock lever so that the stop position of the slide base is controlled. Accordingly, with a simple construction, the changeover to the automatically stop positions can be readily controlled. The physical size of the player cabinet can be extremely reduced.

What is claimed is:

1. A compact record player comprising:
a slide base slidably movable along a receiving position in which a record cannot be played, a play position on a front side of said receiving position, and a record disc change position on a front side of said play position such that said player has a reduced effective lateral depth;
switch means for producing an electrical control signal, and means for moving said slide base in response to said control signal;
a rack member movable back and forth on said slide base;
rack member drive means for driving said rack member; and
locking means movably mounted on said slide base;
wherein said locking means can be selectively engaged with said rack member to thereby control a movement of said slide base.

2. A record player comprising:
a slide base slidably movable among a receiving position, a play position on a front side of said receiving position, and a record disc change position on a front side of said play position;
a rack member movable back and forth on said slide base;
rack member drive means for driving said rack member;
locking means movably mounted on said slide base, wherein said locking means can be selectively engaged with said rack member to thereby control a movement of said slide base; and
a turntable and record detecting means for detecting an attachment and absence of a record disc, said record detecting means being movably mounted on said slide base, wherein when said record disc is attached to said turntable, said record detecting means is moved to a position out of a locus of said locking means so that the engagement between said locking means and said rack member is released, to thereby control the movement of said slide base.

3. A record player as claimed in claim 2, wherein said record detecting means includes a record detecting lever pivotally mounted on said slide base.

4. A record player as claimed in claim 2, wherein said locking means includes a lock lever slidably mounted on said slide base and biased in the sliding direction.

5. A record player comprising:
a player cabinet, a turntable, a chassis mounted on said cabinet,
a slide base slidably movable among a receiving position, a play position, and a record disc change position, said play position being located in front of said receiving position and said record disc change position being located in front of said play position,
a rack member movable back and forth on said slide base,
rack member drive means for driving said rack member,
locking means pivotally supported to said slide base and engageable selectively with said rack member and said chassis, and
record disc detecting means including a stop which is abuttable against an associated stop formed on said chassis at said record disc change position, wherein when a record disc is attached to said turntable, said record detecting means is rotated to a position out of a locus of said locking means so that the engagement between said locking means and said rack member is released to thereby control the movement of said slide base.

6. A record player as claimed in claim 5, wherein said locking means is slidably supported to said slide base and is spring-biased in the sliding direction.

7. A record player comprising:
a tone arm,
a phono cartridge mounted on said tone arm,
switch means for producing an electrical control signal;
a slide base slidably movable among a receiving position in which a record cannot be played, a play position, and a record disc change position, said play position and said record disc change position being located in front of said play position such that said player has a reduced effective lateral depth;
means for moving said slide base between said receiving, play and record disc change positions as a function of said electrical control signal,
a rack member movable back and forth on said slide base,
a rack drive gear for driving said rack member,
a tone arm driving plate for driving said tone arm, and
transmission means for selectively driving said tone arm driving plate, said transmission means being coupled to said rack drive gear,
wherein a first stop position of said transmission means at the time when the slide base is located at said receiving position is substantially equivalent to a second stop position of said transmission means at the time when the slide base is located at said play position.

8. A record player as claimed in claim 7, wherein said transmission means includes a crank pivotally coupled to said rack drive gear.

9. A record player as claimed in claim 7, further comprising a cabinet, a chassis mounted on said cabinet, a tone arm pickup member rotated together with said tone arm and tone arm pickup member stop means movably mounted on said chassis, said stop means being movable in accordance with the position of said slide base, wherein when said slide base is located between said play position and said receiving position and said slide base is located behind said play position, said stop means is moved to a position where said tone arm is prevented to rotate and in abutment with the slide base.

10. A record player as claimed in claim 9, wherein said tone arm pickup plate is located substantially under a bearing of said tone arm, and an opening is formed at an upper portion of a horizontally rotational shaft of said tone arm, said opening through which output lead lines for said pickup phono cartridge are provided.

11. A compact record player comprising:
a turntable,
switch means for producing an electrical control signal;
a slide base slidably movable among a receiving position in which a record cannot be played, a play position and a record disc change position, said play position being located in front of said receiving position and said record disc change position being located in front of said play position such that said player has a reduced effective lateral depth;
means for moving said slide base between said receiving, play and record disc change positions as a function of said control signal,
a tone arm always rotated on the rear side of said turntable except for the play mode, and
record detecting means for detecting the record disc attached to said turntable,
wherein when said turntable is moved from said record disc change position to said play position and the attachment of the record on the turntable is detected by said record detecting means, the tone arm is forwardly rotated to a play commencement position.

12. A compact record player comprising:
a turntable,
a player cabinet,
a chassis mounted on said cabinet,
switch means for producing an electrical control signal;
a slide base slidably movable among a receiving position in which a record cannot be played, a play position, and a record disc change position, said play position being located in front of said receiving position and said record disc change position being located in front of said play position;
means for moving said slide base between said receiving, play and record disc change positions in response to said control signal,
a record disc detecting pin spring-biased to extend downwardly from said turntable when a record disc is attached on said turntable,
record disc detecting means pivotally supported to said slide base and rotatable by said record disc detecting pin extending from said turntable, thereby making said slide base held at said play position, and
a reset lever pivotally to said slide base and coupled to said record disc detecting means so that said reset lever and said record detecting lever are spring-biased to rotate away from each other,
wherein said slide base is located at said record change position, said reset lever is in abutment with an upright portion of said chassis and is slightly rotated to thereby allow said record disc detecting means to escape away from a locus defined by said record detecting pin.

13. A compact record player comprising:
a slide base slidably movable among a receiving position in which a record cannot be played, a play position, and a record disc change position, said play position being located in front of said receiving position and said record disc change position being located in front of said play position,
switch means for producing a control signal, and means for moving said slide base in response to said control signal;
a tone arm,
a rack member movable back and forth on said slide base, and selectively engageable with said slide base,
rack drive means for driving said rack member,
an index cam for controlling a lead-in position of said tone arm and rotatable around a pivot axis thereof in abutment with an outer periphery of the record disc, and
transmission means coupled to said rack drive means,
wherein prior to the stop of said slide base at said record disc change position, said index cam is reset by said crank.

14. A record player as claimed in claims 5, 6, 9, 10 or 12, further comprising:

damping means which are interposed between said player cabinet and said chassis,
a phonomotor mounted on said slide base, and
guide means for guiding said slide base movably.

15. A record player as claimed in claims 1, 2, 3, 4, 7, 8, 11, or 13 further comprising a phonomotor mounted on said slide base and guide means for guiding said slide base movably.

16. A record player as claimed in claim 14, further comprising operational switches fixed to said cabinet.

17. A record player including; a main turntable, which is movable between a received position in which a record cannot be played, a play position and a record disc change position, said play position being located in front of said received position and said record disc change position being located in front of said play position, switch means for producing an electrical control signal controlling movement of said turntable, a sub-turntable receiving preventing device wherein when a sub-turntable having a greater diameter than said main turntable is moved behind said play position, a further rearward movement of said sub-turntable is prevented, and said turntable is returned back to said record disc change position.

18. A record player comprising:
a main turntable, which is movable between a received position in which a record cannot be played, a play position and a record disc change position, said play position being located in front of said received position and said record disc change position being located in front of said play position, an electric switch producing a control signal for controlling movement of said turntable, a record disc receiving preventing device wherein when a record disc having a greater diameter than said main turntable is moved behind said play position, a further rearward movement of said record disc is prevented, and said record disc is returned back to said record disc change position.

19. A record player comprising:
a player cabinet;
a chassis;
coil spring means for floatingly but not movably supporting said chassis to said player cabinet;
a turntable for rotation and attachment of a record disc;
a tone arm for a pickup phono cartridge;
a pickup plate rotated together with said tone arm and said pickup plate for holding said tone arm on the rear side of said turntable at any time except for play mode of the player;
a pickup stopper biased in a direction, abuttable against an associated part of said pickup plate and pivotably supported on said chassis;
a slide plate slidably movable back and forth between a first position, a second position and a third position, said second position being located in front of said first position and said second position being located in front of said second position;
bearing means for rotatably supporting said turntable and a phonomotor for rotating said turntable, said bearing means and said phonomotor being carried on said slide base;
a rack member mounted slidably back and forth on said slide base;
a drive gear for engaging and driving said rack member;
a motor for driving said drive gear for engaging and driving through gear and pulley means;
a crank supported pivotally around a pin fixed to said chassis and including a drive pin, said crank pivotally coupled at one end to said drive gear;
index cam means for limiting the rotation of said tone arm and including a roller for abutting against a periphery of the record disc;
a drive plate having a retaining slot and a window slot both selectively engageable with said drive pin of said crank, said drive plate being biased on the rear side of the cabinet, said drive plate including a lead-in clutch means for engaging with a said pickup plate so as to selectively rotate together, a cam portion for elevating and lowering said tone arm in compliance with the movement of said drive plate, an index cam resetting lever for resetting said index cam means in compliance with a diameter of the record, and a projection for separating said roller of said index cam means from the outer periphery of the record disc for the play mode;
a lock lever pivotally supported to said slide base and slidable in a short range and biased in the sliding direction, said lock lever being selectively engageable with said rack member;
a record detecting pin projectable from an under side of said turntable when the record disc is attached to said turntable;
a record detecting lever for engaging with said lock lever for abutting against said record detecting pin of said turntable so as to be released from said lock lever;
a record detecting lever reset lever pivotally supported on said slider and having a pin abuttable against a portion formed in said chassis for resetting said record detecting lever, said lock lever and said reset lever being spring-biased so as to separate away from each other;
spring means for biasing said reset lever;
roller means for restricting the movement of said slider in the back and forth direction;
operational switches for controlling actuation of said motor selectively in a normal direction or in the opposite direction;
and limit switches for detecting and controlling the movements of said slide base and said drive plate.

* * * * *